United States Patent [19]

Walker et al.

[11] 3,960,611

[45] June 1, 1976

[54] COATING COMPOSITIONS WITH MAGNESIUM PHOSPHATE PIGMENT

[75] Inventors: Ralph Lawrence Walker, Blyth; John Richard Stockdale, Birmingham, both of England

[73] Assignee: Albright & Wilson Limited, Oldbury, England

[22] Filed: Dec. 9, 1974

[21] Appl. No.: 531,201

[30] Foreign Application Priority Data

Dec. 13, 1973 United Kingdom............... 57871/73
Sept. 24, 1974 United Kingdom............... 41484/74

[52] U.S. Cl.......................... 148/6.15 R; 148/31.5; 148/6.15 Z; 106/14; 106/288 B; 148/6.2; 260/37 R
[51] Int. Cl.²......................................... C09D 5/08
[58] Field of Search................. 148/6.15 Z, 6.15 R; 106/14, 260, 292, 288 B

[56] References Cited
UNITED STATES PATENTS 1,367,597   2/1921   Gravell.............................. 106/14 X

FOREIGN PATENTS OR APPLICATIONS 1,283,418   11/1968   Germany........................ 148/6.15 R

*Primary Examiner*—Ralph S. Kendall
*Attorney, Agent, or Firm*—Flynn & Frishauf

[57] ABSTRACT

Pigments containing a magnesium phosphate as a component of an active pigment to be used in an anticorrosive paint have been found to be especially useful when the pigment is present in a pigment volume concentration of from 20 to 30%. It has also been discovered that the proportion of magnesium phosphate in the pigment may be relatively low levels while the composition maintains a satisfactory degree of corrosion inhibition.

13 Claims, No Drawings

COATING COMPOSITIONS WITH MAGNESIUM PHOSPHATE PIGMENT

This invention relates to coating compositions, more specifically to so-called primer compositions designed to inhibit corrosion of ferrous metals to the surface of which they are applied.

Known primer compositions comprise a binding medium and one or more ferrous-corrosion inhibiting pigments in which latter capacity there have been suggested for use red lead, calcium plumbate, zinc chromate, iron oxides and phosphates of calcium, zinc, lithium and barium. For example UK patent 915512 discloses a primer composition comprising as a corrosion inhibitor a phosphate of calcium or zinc in a specified concentration range and UK patent 904861 discloses the use of calcium, zinc, lithium and barium phosphates together with red lead, calcium plumbate, zinc chromate or iron oxide. Such pigments may also contain other conventional ingredients such as pigment extenders and opacifying pigments. Such additional ingredients do not directly affect the anti-corrosive properties of the primer compositions.

Shiresalkar and Samban in the Journal of the Colour Society (April - June, 1969 pp. 9–12) reported on investigation into the use of aluminum, magnesium, zinc, manganese and barium phosphates as anticorrosive paint pigments. The corrosion inhibiting effect of these phosphates were tested by three different methods in three different types of paint media. The media incorporating magnesium phosphate had pigment volume concentrations (hereinafter referred to as PVC's) of approximately 34% and the magnesium phosphate comprised some 66% by volume of the total; the remainder of the pigment being made up by equal weights of iron oxide, a known corrosion inhibitor and barytes, a known pigment extender. (PVC is herein defined as the percentage by volume of the pigment material in the total volume of dried paint film).

The author's conclusion was that whilst magnesium and other phosphates gave a satisfactory performance in some tests they were definitely unsatisfactory in others; only zinc and barium phosphates were found to be consistantly satisfactory. In particular magnesium phosphate in an alkyd resin based paint gave unsatisfactory results in both a salt spray and a corrosion cabinet test.

We have now made the suprising discovery that the use of magnesium phosphate as a pigment or as all or part of the active component of a pigment in anti-corrosive paints in a certain range of PVC's not investigated by Shiresalker and Samban not only results in a paint giving satisfactory corrosion inhibiting properties in the conditions in which those authors found it to be unsatisfactory but also provides superior performance to similar paints incorporating zinc and/or barium phosphates. In other words we have discovered a critical range of PVC's for magnesium phosphate containing pigments in anticorrosive paints over which the findings of the previous authors are reversed. Furthermore, we have discovered that this advantage extends over a range of pigment composition, i.e., that the amount of magnesium phosphate in the pigment may be varied from 20 to 90% without affecting the corrosion inhibiting properties of the composition to any large extent. This advantageous in that the relative propertions of the various components of the pigment may be varied enabling other desirable properties of the pigment such as its opacity to be controlled and offering obvious economic advantages. The use of magnesium phosphate is advantageous when compared to the conventionally used chromate corrosion inhibitors since they are non-toxic and therefore desirable from an ecological viewpoint.

Accordingly the invention provides a non-aqueous primer composition which comprises as a ferrous corrosion inhibitor a pigment comprising a magnesium phosphate in a PVC (as hereinbefore defined) of from 20 to 30%. The magnesium phosphate for present use may be normal or acid phosphate and may or may not contain water of hydration. Thus there may be used trimagnesium ortho-phosphate $Mg_3(PO_4)2$ : magnesium hydrogen phosphate $MgHPO_4$ : monomagnesium tetrahydrogen phosphate $MgH(PO_4)_2$ in any of their various possible hydration states. In air drying paints we prefer to use trimagnesium orthophosphate in which term we include the material commercially sold as such which actually includes some dihydric magnesium phosphate. In air drying paints we most prefer to use the trimagnesium phosphate which analyses empirically as the hexahydrate. In stoving paints we prefer to use less hydrated forms such as the mono, di, tri, or tetrahydrate or the anhydrous salt.

These magnesium phosphates have been found to be effective as corrosion inhibitors at lower PVC's than are normally effective when using the zinc phosphates. We prefer to use a composition having a PVC which is from 22 to 25% most preferred being paints having a PVC of substantially 25%.

The pigment material used in the novel compositions comprises a magnesium phosphate optionally together with one or more known corrosion inhibitors and/or other conventional pigment ingredients.

The degree of corrosion protection offered by the compositions of the invention is greatest when the proportion of magnesium phosphate in the pigment is high, particularly good corrosion protection being obtained when the pigment comprises from 70 to 90% by weight of the magnesium phosphate. It has been discovered that this proportion may be reduced to as little as 20% by weight by replacing part of the magnesium phosphate with other optional pigment ingredients and the corrosion protection afforded by paints containing such pigments will only fall by a factor of approximately 20%. In many cases this reduction may be tolerable, thus the proportion of magnesium phosphate in the pigment material of the novel compositions may be from 20 to 90% by weight; preferably from 30 to 90% by weight; most preferably from 70 to 90% by weight or for certain uses 20 to 40% by weight of magnesium phosphate may be preferable. Further corrosion inhibitors which may be used in conjunction with the magnesium phosphate include red lead, calcium plumbate, zinc chromate, strontium carbonate, lead silico chromate, barium metaborate (as sold under the registered trade-name Busam) and mixed zinc/calcium molybdates (as sold under the trade-name White Molys).

The pigments of the invention may also contain other ingredients which do not directly affect the anti-corrosive properties of the composition. Such ingredients include pigment extenders such as barytes, talc, dolomite and calcium carbonate; opacifying agents such as titania, anti-chalking agents such as antimony oxide, antisettling agents such as asbestine and china clay, antiskinning agents which are especially desirable in thixotropic paints such as ethyl methyl ketoxime, flatting agents such as diatomaceous silica and anti-checking agents for use in stoving paints. In addition to these there are a number of particular additives known in the art as providing other particular effects all of which are included in the scope of the invention.

The novel primer compositions may be either air-drying or stoving paints and will comprise conventional binders including organic film-forming binders or precursors thereof. Such materials include drying oils such as linseed oil, oleo-resinous media, alkyd resins including styrenated and vinyl alkyl resins, modified phenolic resins, epoxy ester and epoxy resins. Stoving paints of the invention may comprise either conventional mixtures of resins which are crossed-linked on heating such as alkyd-urea or alkyd-melamine mixtures of 'low' polymers which further polymerise on heating to produce e.g. alkyd, polyester or acrylic 'high' polymers.

The invention is illustrated by the following examples:

EXAMPLE 1

A series of compositions containing zinc phosphate or magnesium phosphate were made up so as active material constituted 90% by volume of the total pigment; the remaining 10% being titanium dioxide. These pigments were incorporated into paint formulations made to the manufacturers specification using Epok 1060/75 as the binder and white spirit as the solvent. Epok 1060/75 is a modified alkyd resin containing 22% phthalic anhydride and 65% linseed oil esterfied with penta eruthritol. Suitable amounts of resin are used to give a useful paint having a particular PVC and the formulations are made up by conventional methods.

The paints were applied to mild steel panels which had been degreased according to British Standard 3900 by a spinning technique so as to leave a film having a thickness of one thousandth of an inch when dry. The panels were allowed to age for seven days. They were then tested in a salt spray cabinet as in British Standard 3900 Part F4 and a humidity cabinet as in British Standard 3900 Part F2. In the salt spray test a more dense salt spray than normally used was applied. Before this testing the painted surfaces of the panels were scratched along each diagonal. The tests were carried out over periods of 300 hours for surface having a primer coat only and 500 hours and 1000 hours for surfaces having three coats of paint. For the humidity cabinet tests, the panels were not scratched and the testing carried out over periods of 300 hours for surfaces with a primer coat only and 500 hours for surfaces having three coats of paint.

The assessment was carried out by systematically awarding marks for each fault in the surface. Separate scores were assessed for blistering and corrosion of the panels. The lower mark obtained indicates a paint having effective corrosion inhibiting properties. The results are presented in table (1). All pigments contain 90% magnesium or zinc phosphate and 10% titania. Paint numbers 1 – 6 contain magnesium phosphate and paint numbers 7 – 11 contain zinc phosphate.

| % PVC | Paint No. | Humidity Three Coat | | | Salt Spray Three Coat | | | | | Total | | |
|---|---|---|---|---|---|---|---|---|---|---|---|---|
| | | Primer 300hr Corr (M) | 500hr Blist (P) | 500hr Corr (M) | Primer 300hr Corr (M) | 500hr Blist (P) | 500hr Corr (M) | 1000 hr Blist (P) | 1000 hr Corr (M) | | | Total Mark |
| 10 | 1 | 1 | 9½ | 4 | 1 | 4½ | 5 | 5 | 6 | 19 | 17 | 36 |
| 20 | 2 | ½ | 10 | 0 | ½ | 4 | 3 | 5 | 3 | 19 | 7 | 26 |
| 25 | 3 | ½ | 9 | ½ | ½ | 5 | 3 | 5 | 3 | 19 | 7½ | 26½ |
| 30 | 4 | 2 | 8 | 2 | ½ | 3 | 2 | 5½ | 4 | 16½ | 10½ | 27 |
| 33.3 | 5 | 6 | 6 | 6 | 2½ | 4 | 3 | 4½ | 5 | 14½ | 22½ | 37 |
| 40 | 6 | 6 | 9½ | 7 | 8 | 3 | 5 | 4 | 5 | 16½ | 31 | 47½ |
| 10 | 7 | 9 | 3 | 7½ | 2 | 4 | 4 | 4 | 5 | 11 | 27½ | 38½ |
| 20 | 8 | 8 | 3 | 8 | 1 | 3 | 3 | 4 | 5 | 10 | 25 | 35 |
| 30 | 9 | 2 | 4 | 9½ | 1 | 3 | 3 | 4 | 5 | 11 | 20½ | 31½ |
| 40 | 10 | 0 | 3½ | 6 | 1 | 3 | 1  4½ | 3 | 11 | 11 | 22 | |
| 45 | 11 | 0 | 5 | 7 | 0 | 3 | 1 | 4 | 3 | 12 | 11 | 23 |

EXAMPLE 2

The effect of varying the amount of magnesium phosphate in the pigment was investigated for formulating a series of paints having 25% PVC with 10% by volume titanium dioxide and the remaining 90% magnesium phosphate and bleached barytes in varying proportions.

Testing was carried out according to the procedure described in example 1, the results being as follows:

| %v/v Mag. phosphate In pigment | Paint No. | Primer 300hr Corr (M) | Three Coat 500hr | | Primer 300hr Corr (M) | Three Coat 500hr | | 100hr | | Total | | |
|---|---|---|---|---|---|---|---|---|---|---|---|---|
| | | | Blist (P) | Corr (M) | | Blist (P) | Corr (M) | Blist (P) | Corr (M) | Blist | Corr | Grand |
| 20 | 12 | 2 | 9½ | 8 | 0 | 4 | 4 | 4 | 6 | 17½ | 20 | 37½ |
| 40 | 13 | 2 | 9½ | 1 | 0 | 3½ | 4 | 4½ | 6 | 17½ | 13 | 30½ |
| 60 | 14 | 2 | 9½ | 1 | 0 | 3½ | 4 | 4½ | 5 | 17½ | 12 | 29½ |
| 80 | 15 | 3 | 9½ | 2½ | ½ | 3½ | 4 | 3½ | 5 | 16½ | 15 | 31½ |

What we claim is:

1. A non-liquid anti-corrosion paint composition comprising a binder and a pigment, said pigment being in a pigment volume concentration of from 20 to 30%, and said pigment containing at last 20% by weight of a magnesium phosphate.

2. A composition according to claim 1 wherein the magnesium phosphate is trimagnesium orthophosphate.

3. A composition according to claim 2 wherein the pigment comprises from 20 to 90% by weight of trimagnesium orthophosphate.

4. A composition according to claim 3 wherein the pigment comprises from 60 to 90% by weight of trimagnesium orthophosphate.

5. A composition according to claim 4 wherein the pigment is in a pigment volume concentration of from 22 to 25%.

6. A composition according to claim 3 wherein the pigment comprises from 20 to 40% by weight of trimagnesium phosphate.

7. A composition according to claim 1 wherein the pigment comprises from 20 to 90% by weight of a magnesium phosphate.

8. A composition according to claim 7 wherein the pigment comprises from 60 to 90% by weight of a magnesium phosphate.

9. A composition according to claim 8 wherein the pigment is present in a pigment volume concentration of from 22 to 50%.

10. A composition according to claim 1 wherein the pigment comprises from 20 to 40% by weight of a magnesium phosphate.

11. A composition according to claim 10 wherein the pigment is present in a pigment volume concentration of from 22 to 50%.

12. A method of inhibiting the corrosion of a ferrous metal substrate which comprises coating the surface of the substrate with a composition according to claim 1.

13. A corrosion-resistant coated ferrous substrate having a surface coating of a paint composition comprising a binder and a pigment, said pigment being present in an amount of from 20 to 30% by volume, and said pigment containing at least 20% by weight of a magnesium phosphate.

* * * * *

UNITED STATES PATENT OFFICE
CERTIFICATE OF CORRECTION

Patent No. 3,960,611    Dated June 1, 1976

Inventor(s) Ralph L. WALKER and John R. STOCKDALE

It is certified that error appears in the above-identified patent and that said Letters Patent are hereby corrected as shown below:

Column 3, line 50, correct the spelling of "pentaerythritol".

The upper Table which bridges Columns 3 and 4 is correctly depicted below:

| % PVC | Paint No. | Humidity Three Coat | | | Salt Spray Three Coat | | | | | | Total | | |
|---|---|---|---|---|---|---|---|---|---|---|---|---|---|
| | | Primer 300hr Corr (M) | 500hr Blist (P) | 500hr Corr (M) | Primer 300hr Corr (M) | 500hr Blist (P) | 500hr Corr (M) | 1000 hr Blist (P) | 1000 hr Corr (M) | Blist | Corr | Total Mark |
| 10 | 1 | 1 | 9½ | 4 | 1 | 4½ | 5 | 5 | 6 | 19 | 17 | 36 |
| 20 | 2 | ½ | 10 | 0 | ½ | 4 | 3 | 5 | 3 | 19 | 7 | 26 |
| 25 | 3 | ¼ | 9 | ¼ | ½ | 5 | 3 | 5 | 3 | 19 | 7½ | 26½ |
| 30 | 4 | 2 | 8 | 2 | ½ | 3 | 2 | 5½ | 4 | 16½ | 10½ | 27 |
| 33.3 | 5 | 6 | 6 | 6 | 2½ | 4 | 3 | 4½ | 5 | 14½ | 22½ | 37 |
| 40 | 6 | 6 | 9½ | 7 | 8 | 3 | 5 | 4 | 5 | 16½ | 31 | 47½ |
| 10 | 7 | 9 | 3 | 7½ | 2 | 4 | 4 | 4 | 5 | 11 | 27½ | 38½ |
| 20 | 8 | 8 | 3 | 8 | 1 | 3 | 3 | 4 | 5 | 10 | 25 | 35 |
| 30 | 9 | 2 | 4 | 9½ | 1 | 3 | 3 | 4 | 5 | 11 | 20½ | 31¼ |
| 40 | 10 | 0 | 3¼ | 6 | 1 | 3 | 1 | 4½ | .3 | 11 | 11 | 22 |
| 45 | 11 | 0 | 5 | 7 | 0 | 3 | 1 | 4 | 3 | 12 | 11 | 23 |

Signed and Sealed this

Fourteenth Day of September 1976

[SEAL]

Attest:

RUTH C. MASON
Attesting Officer

C. MARSHALL DANN
Commissioner of Patents and Trademarks